United States Patent
Meunier et al.

(10) Patent No.: US 7,971,473 B1
(45) Date of Patent: Jul. 5, 2011

(54) APPARATUS AND PROCESS FOR TESTING TURBINE VANE AIRFLOW

(75) Inventors: Steven A Meunier, Hobe Sound, FL (US); Andrew R Narcus, Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 334 days.

(21) Appl. No.: 12/147,590

(22) Filed: Jun. 27, 2008

(51) Int. Cl.
*G01M 15/14* (2006.01)
(52) U.S. Cl. .................................................. 73/112.01
(58) Field of Classification Search ............... 73/112.01, 73/112.03
See application file for complete search history.

(56) References Cited

U.S. PATENT DOCUMENTS

| | | | | |
|---|---|---|---|---|
| 4,767,260 | A * | 8/1988 | Clevenger et al. | 415/115 |
| 5,522,134 | A * | 6/1996 | Rowe et al. | 29/889.1 |
| 5,577,884 | A * | 11/1996 | Mari | 415/115 |
| 6,512,379 | B2 * | 1/2003 | Harrold et al. | 324/632 |
| 6,955,523 | B2 * | 10/2005 | McClelland | 415/115 |
| 7,488,157 | B2 * | 2/2009 | Marini et al. | 416/193 A |
| 7,685,870 | B2 * | 3/2010 | Quinn et al. | 73/112.01 |
| 2003/0209084 | A1 * | 11/2003 | Fleming | 73/861.74 |
| 2005/0095118 | A1 * | 5/2005 | Liang | 415/115 |
| 2008/0016971 | A1 * | 1/2008 | Bunce et al. | 73/865.5 |
| 2008/0025842 | A1 * | 1/2008 | Marini et al. | 416/193 A |
| 2009/0084170 | A1 * | 4/2009 | Quinn et al. | 73/112.01 |
| 2009/0126508 | A1 * | 5/2009 | Kuhlemann | 73/861.94 |

* cited by examiner

*Primary Examiner* — Eric S McCall
(74) *Attorney, Agent, or Firm* — John Ryznic (57) ABSTRACT

An apparatus and process for testing airflow through a turbine vane under actual engine airflow conditions. The apparatus includes first a second static pressure chamber each with an opening on which a cover plate is to be secured to enclose the chamber and hold the vane in place for testing. Each chamber includes a pressurized air supply tube that extends into the chamber to deliver the volume of air necessary for testing the airflow. The chamber is of such a size that the high volume of pressurized air delivered to the chamber will enter the vane as static air for the testing. The cover plates are formed of two halves in which the vane endwall can be secured between the halves. A stand supports both cover plates so that the plates and the vane can be moved into position where the cover plates are secured to the opening of the chamber for testing. The pressurized air supplied to both chambers flows into the vane and through the film cooling holes so that proper testing of the airflow can be done. If a vane has two separate internal cooling passages, each pressure chamber can be supplied with different pressures to simulate airflow conditions through the two different passages.

24 Claims, 5 Drawing Sheets

APPARATUS AND PROCESS FOR TESTING TURBINE VANE AIRFLOW

FEDERAL RESEARCH STATEMENT

None.

CROSS-REFERENCE TO RELATED APPLICATIONS

None.

BACKGROUND OF THE INVENTION

1. Field of the Invention

The present invention relates generally to an apparatus and process for testing airflow through a turbine vane or nozzle, and more specifically to simulating the engine airflow conditions in which to test the vane.

2. Description of the Related Art Including Information Disclosed Under 37 CFR 1.97 and 1.98

In a gas turbine engine, such as an industrial gas turbine engine (IGT), the turbine airfoils, such as rotor blades (also referred to as a bucket) and stator vanes (also referred to as a nozzle), are provided with internal cooling air passages and film cooling holes to provide cooling of the airfoil while exposed to the extremely high temperatures of the gas flow during engine operation. When a turbine vane, for example, is designed, it must be tested to determine if the cooling passages and film holes are sized properly in order to prevent insufficient or excessive cooling. Excessive cooling would include passing too much cooling air through the passages or film holes in which some of the cooling air is not effectively utilized. Usage of too much cooling air reduces the efficiency of the engine which leads to higher operating costs. Insufficient usage of cooling air leads to component overheating and premature replacement, and also leading to higher operating costs.

Testing the airfoil within an actual engine during real engine operation is a very expensive and time consuming way to test the part. The engine must be shut down and taken apart in order to remove the part for inspection. Test rigs have also been proposed in which the part is placed on the test rig and pressurized cooling air is passed through the part to check for airflow through individual film holes. This process has been used for small airfoils, but is not known for larger airfoils in which higher volumes of airflow is required to simulate the actual conditions for the larger airfoils.

In some engines, some of the turbine vanes are sectioned internally to provide for different levels of cooling air pressure to minimize airflow usage. The pressure side of the vane will be exposed to a higher hot gas flow pressure than would the suction side of the vane. Therefore, different cooling air flow passages are formed within the vane in which one passage would supply the pressurized cooling air to the pressure side passages while another would supply the pressurized air to the suction side passages. Under this method, the suction side can be supplied with lower pressurized cooling air without the need of bleeding off higher pressure air used for the pressure side cooling passages and reducing the pressure accordingly.

In the testing of larger airfoils such as stator vanes, pressurized cooling air is applied to one small section of the airfoil for testing and not to the entire airfoil due to the lack of high pressures and high volumes of airflow required.

BRIEF SUMMARY OF THE INVENTION

It is an object of the present invention to provide for an apparatus and a process for testing vane airflow with a high volume of airflow for the entire vane.

It is another object of the present invention to provide for an apparatus and a process for testing a vane airflow in which similar vane airflow conditions and supply pressure distributions are reproduced. The apparatus can supply the same or different pressure levels to internal passage sections of the vane.

It is another object of the present invention to provide for an apparatus and a process for testing a vane airflow in which the vane is exposed to a static cooling supply pressure for testing, similar to the actual engine operating conditions.

It is another object of the present invention to provide for an apparatus and a process for testing a vane airflow in which various sizes of vanes can be tested using a minimal amount of parts for the test stand.

It is another object of the present invention to provide for an apparatus and a process for testing a vane airflow in which two different air pressures can be supplied to the vane that has two separate internal cooling passages.

The present invention is an apparatus and a process for testing a vane airflow in which a vane is secured on both ends to circular plates and the plates are secured to two large volume air chambers. Pressurized air from the same or different source(s) is supplied to the two large volume air chambers to produce a static air pressure that is delivered to both sides of the vane. A cross-over tube may be connected to both of the large volume chambers so that any pressure difference in the supply will be equalized if the same pressure is required. The high volume of airflow into the chambers produces a static pressure to deliver to the vane cooling air passages and then through the film cooling holes so that the vane can be tested for adequate and proper cooling air flow under similar engine conditions.

The vane is held between half circular plates bolted together in which the vane end walls are sealed to prevent leakage of the pressurized cooling air for the test. The two circular plates that secure the vane for testing are supported on a stand that can be adjusted for both height and width in order to accommodate various sizes of vanes. The vane supported on the test stand is pushed into place between the two chambers and the circular plates secured to the open ends of the chambers by a plurality of clamps. The clamps secure the circular plates to the open end of the chambers in a sealed manner to limit the escape of the pressurized air supplied to the chambers.

The circular plates that secure the vane endwalls for testing are semi-circular shaped with an opening that conforms to the shape of the vane endwall. The opening that is formed within the circular plate is offset such that the opposed corners of the opening are aligned with the edges of the half-moon circular plate halves. A sealing material such as seal tape is placed between the vane endwalls and the circular plates to limit the amount of cooling air-leakage in the testing.

The vane is held in place by circular plates on the two endwalls. The circular plates include openings that allow for the pressurized air within the adjacent chamber to be supplied to the endwall of the vane so that the pressurized air will flow only into the passage of the vane connected to the endwall. The second circular plate on the opposite side of the vane also includes an opening in which the pressurized air from the chamber can be supplied to the endwall and the internal cooling passage connected to that endwall. The pressure of the air in the first chamber can be different than the pressure in the second chamber so that different pressures are supplied to the two internal cooling passages of the vane.

DETAILED DESCRIPTION OF THE INVENTION

Figure 1:
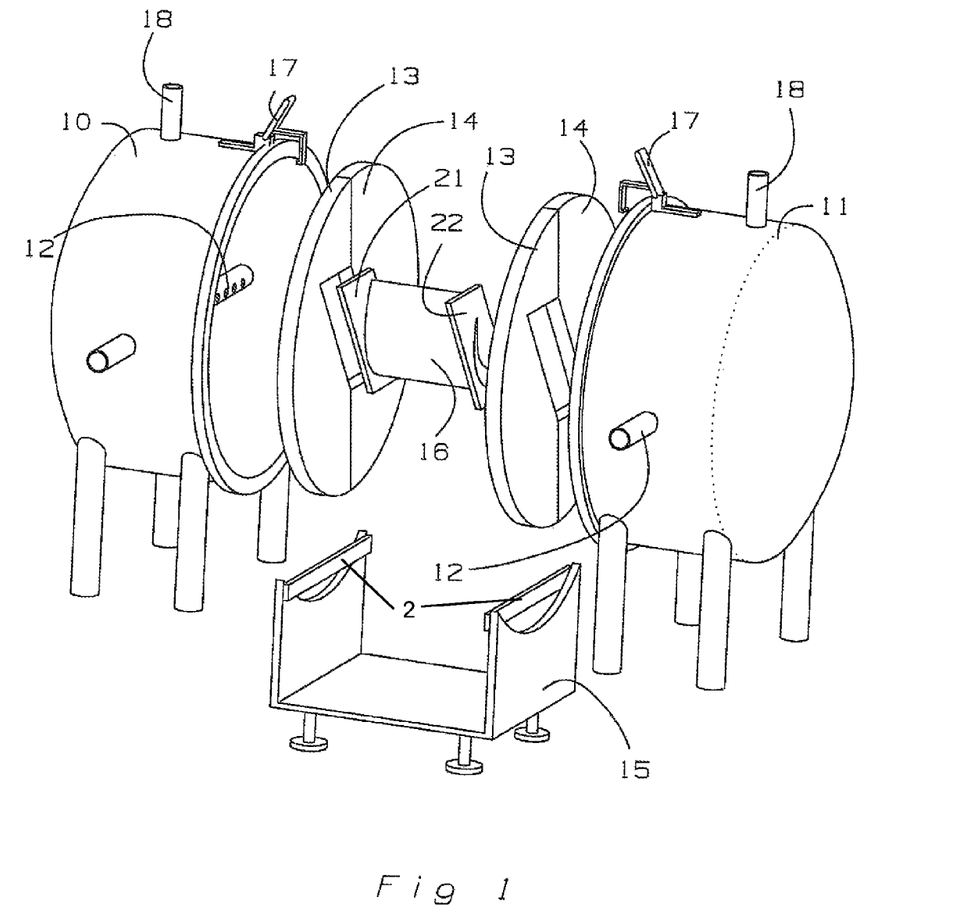
FIG. 1 shows a schematic view of the vane testing apparatus of the present invention.

The turbine vane testing apparatus of the present invention is shown in FIG. 1 in the unassembled state for clarity. A first pressure chamber 10 has the shape of a concave hollow chamber with an opening forming an annular flat surface. An air supply pipe 12 is secured to the chamber 10 and extends from the outside for securing a pressure supply pipe or tube, and extends to the inside to supply the high volume of air flow to the chamber. The air supply pipe 12 includes a row of openings extending along the length of the air supply tube 12 to discharge the pressurized air into the chamber. A crossover tube connection 18 opens on the top surface of the chamber and is for connecting a cross-over tube to the second chamber 11 if required.

A turbine vane 16 to be tested could be an actual vane used in an engine or a model of the part to be used in the gas turbine engine or a reproduction that will perform just as the actual vane would. The vane includes an airfoil section with the film cooling holes opening onto the airfoil surface, and an inner endwall 21 and an outer endwall 22. The two endwalls 21 and 22 both have a four-sided cross sectional shape when looking at the vane from the top or bottom. The vane endwalls 21 and 22 are mounted into a four-sided opening formed between two half circular plates 13 and 14 which secure the vane against the opening of the chambers 10 and 11. The circular plates are formed from two half circular sections 13 and 14 with the four-sided opening formed within. The two opposed corners of the rectangular opening are aligned with the straight line edges of the half circular plate halves. The corner is positioned at a point where the two half circular sections are abutted together. The two plate halves are joined together by bolts that pass through holes in one of the plate halves 13 and thread into threaded holes formed in the other plate half 14. Alignment pins are also used in the two half circular plates to aid in positioning the two hales together prior to the bolts being fastened. A seal such as sealing tape is applied to the sides of the four-sided opening such that the sealing tape will be pinched between the endwall surface and the opening surface to provide for a seal between the circular plate and the vane endwall 21 or 22.

Each endwall 21 and 22 of the vane is secured within the four-sided opening formed in the circular plate halves and supported by a test stand 15. The test stand 15 includes a bottom section with legs extending downward and two sides that extend from the floor section upward. The two sides support the two circular plates that support the vane endwalls 21 and 22. The stand sides can be adjusted in a sideways manner such that the distance between the sides can vary so that various sizes of vanes can be supported. The height of the stand can also be adjusted so that the circular plates can be supported at the proper height to be secured to the chamber openings by the clamps.

A plurality of clamps 17 are mounted onto the circular opening of each chamber 10 and 11 and arranged around the circumference and used to clamp the circular plate to the respective chamber. The circular plates are preferably formed from an alloy material such as aluminum and are of such thickness to be capable of withstanding the high static pressure developed within the chamber so that the testing can be performed. In order to use the test chambers with any sized vane, the circular plate halves will have the same outer diameter so that they will fit onto the opening of the chambers. The four-sided openings on the circular plates will be sized to the particular vane that is to be tested. Thus, a particular vane will use a unique circular plate halves to support the vane, and the circular plates are then secured to the chambers for testing.

Since the outer endwall of the vane is secured to a first circular plate assembly and the inner endwall is secured to the second circular plate assembly, a different pressure can be supplied to the first chamber and therefore the first endwall than can be supplied to the second chamber if the vane includes two different internal cooling air passages. When a vane includes two different internal cooling air passages, one passage is supplied with cooling air from the outer endwall chamber while the second passage is supplied from the inner endwall chamber. Cooling air supplied to the outer endwall chamber is supplied from one of the pressure chambers while the inner enwall chamber is supplied from the other pressure chamber. Thus, the two pressure chambers can also supply pressurized air to the endwall chambers which also deliver cooling air to any film cooling holes associated with the two endwalls. A pressure side cooling air passage might be associated with the outer endwall chamber to supply pressurized cooling air to the outer endwall film holes and the pressure side film holes of the vane. The one pressure chamber associated with the outer endwall is then used to supply the pressurized air to this cooling circuit. A suction side cooling air passage associated with the inner endwall chamber is supplied with pressurized air from the other pressure chamber to supply the pressurized air to the inner endwall film holes and the suction side film holes under a different pressure than the outer endwall. Therefore, the testing apparatus can be used to supply pressurized air to the two cooling air passages in the same vane at different pressures in order to test the airflow through the vane to simulate the actual airflow conditions in the vane.

Figure 2:
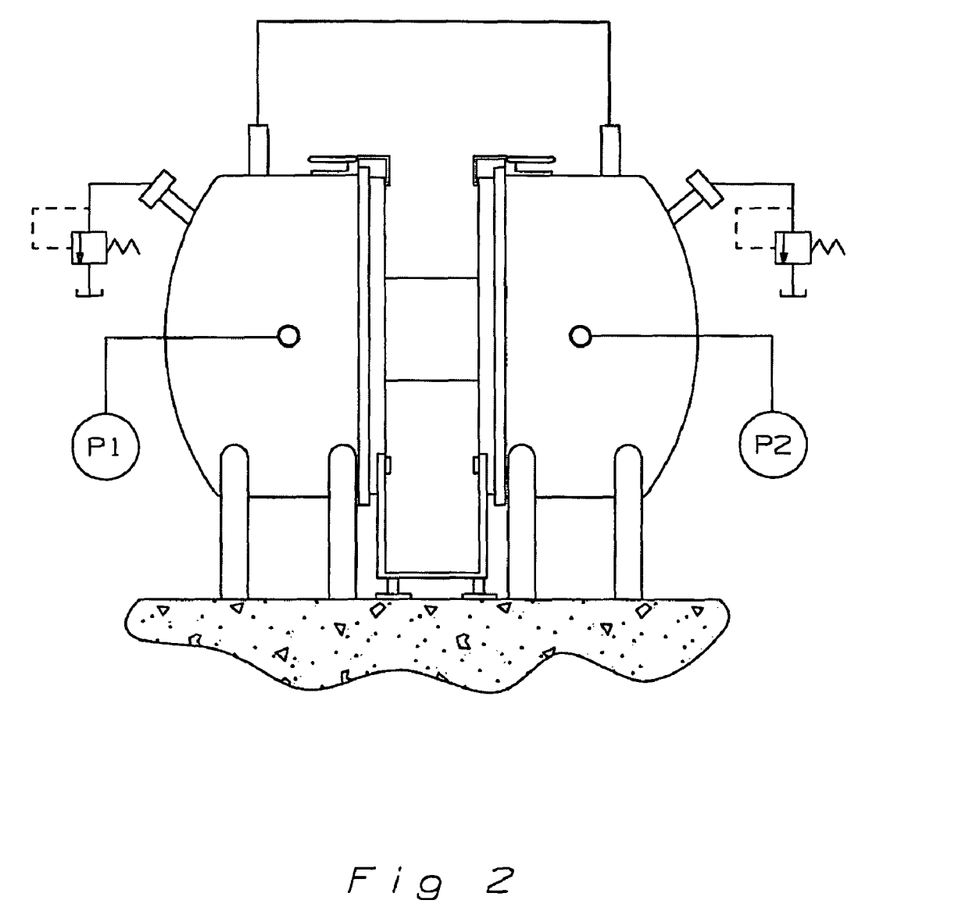
FIG. 2 shows a cross section view of the vane testing apparatus from the side with the vane secured in the testing conditions.

FIG. 2 shows the turbine vane testing assembly in the assembled state and ready for testing the vane. The pressure sources such as a high pressure tank or a pump are connected to the two pressure tubes 12 on each of the two pressure chambers 10 and 11 to supply the necessary volume of air flow to the chambers. A cross-over tube may be connected to the two cross-over connectors 18 so that the pressures within the two chambers 10 and 11 will be equalized during the testing process. The two circular plates 13 and 14 are secured to the chamber openings by the plurality of quick release clamps 17 arranged around the circumference. The test stand 15 is adjusted for the proper height and width of the vane so that the circular plates 13 and 14 are placed into position to be clamped onto the chamber openings. Connected onto one chamber is a pressure relief valve to relieve excess pressure that is applied to the chambers and prevent any possibility of damage to the chambers or prevent injury to the test operator.

Figure 3:
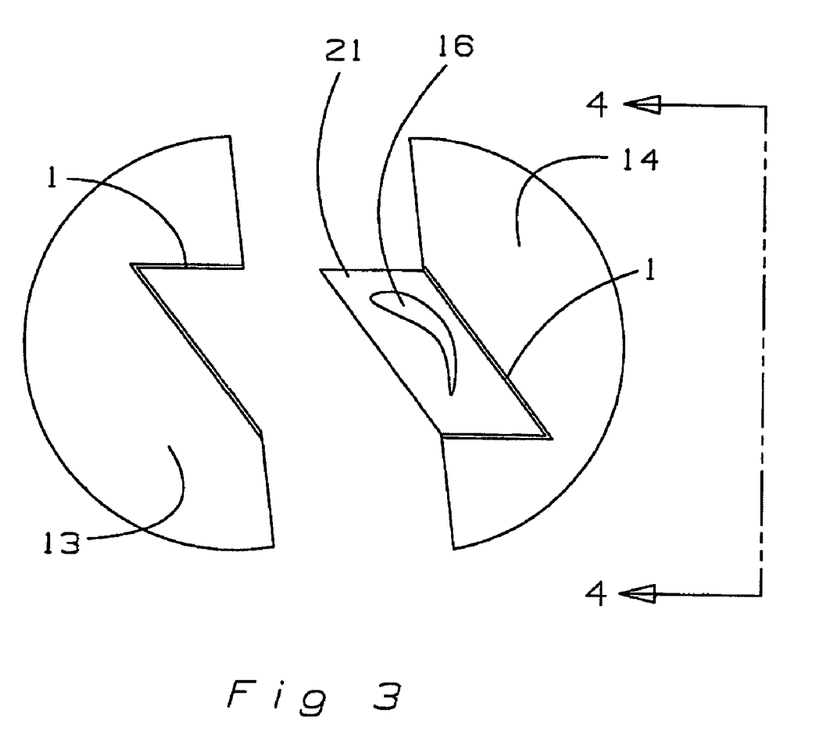
FIG. 3 shows a top view of one of the circular plates used to hold the vane in place during testing.
Figure 4:
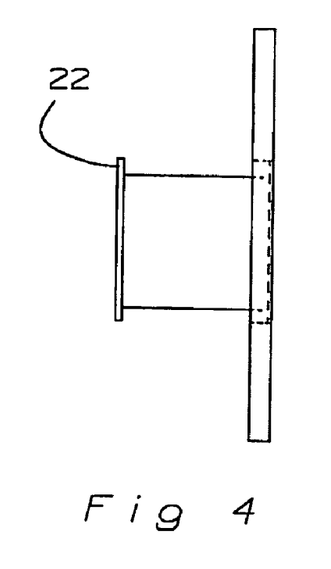
FIG. 4 shows a cross section side view of the vane secured within the circular plates of FIG. 3.

FIG. 3 shows a top view of the circular plate halves 13 and 14 with a four-sided opening or cutout on the inner edge of the half plate section. The four-sided openings 1 in the plate halves are shaped and sized to fit the endwalls of the vane so that they can be secured in a leakage-free manner during testing. The opposed corners of the endwalls are aligned with the straight edges of the half plates. Two long threaded rods are used to secure the plate halves together and pinch the endwall between the two plates. FIG. 4 shows a side view of the circular plate with the endwall secured within the four-sided opening.

Figure 5:
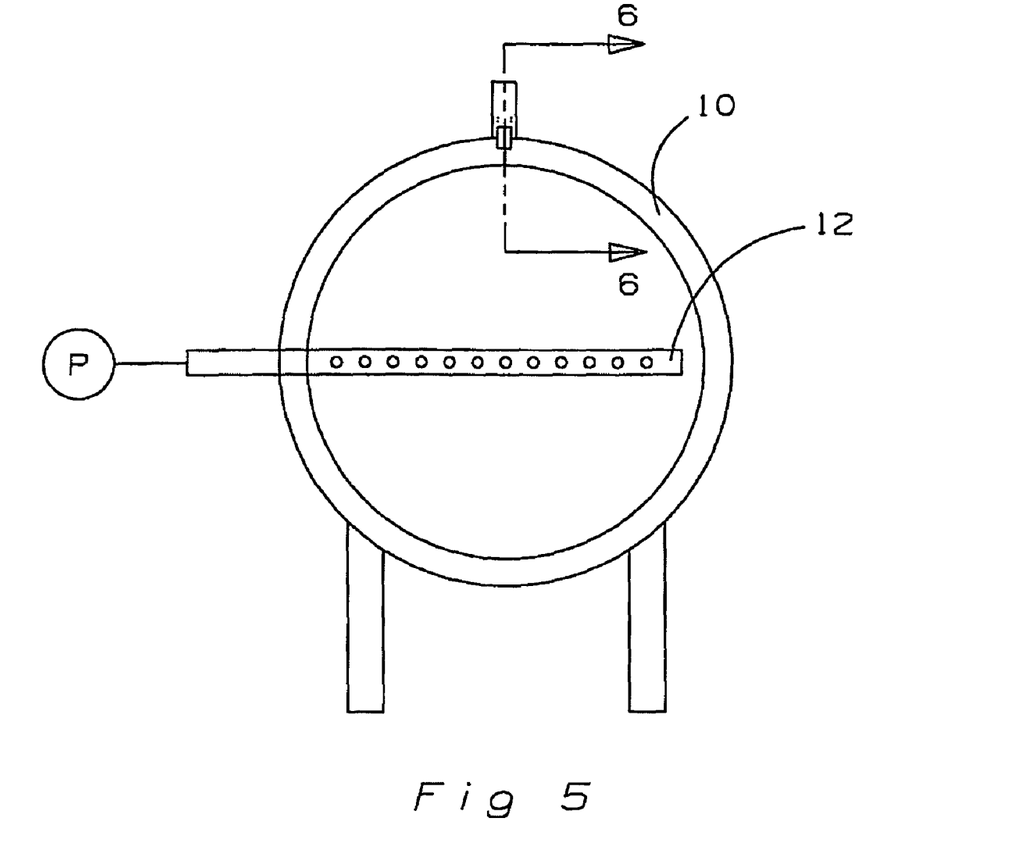
FIG. 5 shows a front view of one of the chambers with the pressure supply tubes inside.

FIG. 5 shows a front view of one of the two chambers 10 and 11 showing the concave inside with the air supply tube 12 extending through the wall and into the inside of the chamber. Both chambers are the same size and shape so FIG. 5 represents both chambers. The air supply tube 12 includes a row of exit holes to discharge the air from the hollow passage through the tube and into the chamber.

Figure 6:
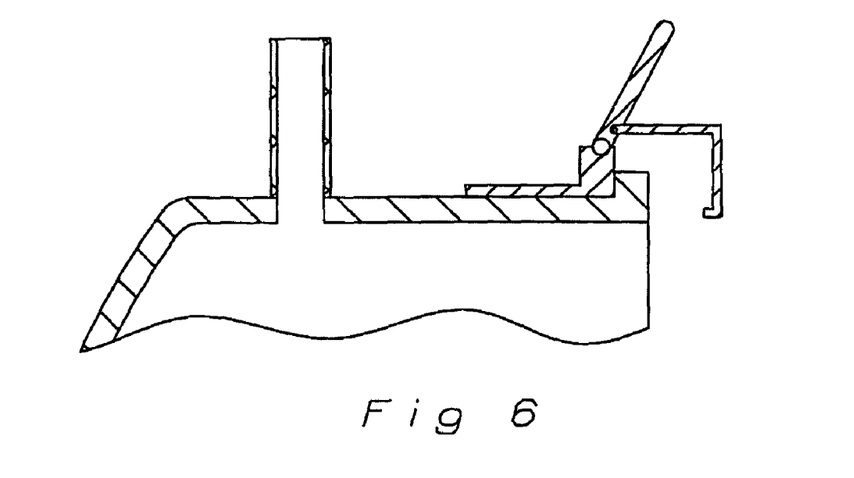
FIG. 6 shows a cross section view of the clamp on the open end side of the chambers.

FIG. 6 shows the top front edge of the chamber with the cross-over tube connector extending from the top surface, and shows one of the clamps used to secure the circular plate to the opening edge of the chamber. A lever is connected to the clamp. When the lever is pivoted toward the rear of the chamber, the clamp part moves axially toward the rear and clamps the plate to the annular ridge or ledge forming the opening of the chamber. The clamps provide for a quick release clamping mechanism that will allow for quick placement and removal of the circular plate to and from the chamber. This will speed up the testing process so that several tests can be performed with little time between testing used for setting up the apparatus.

Figure 7:
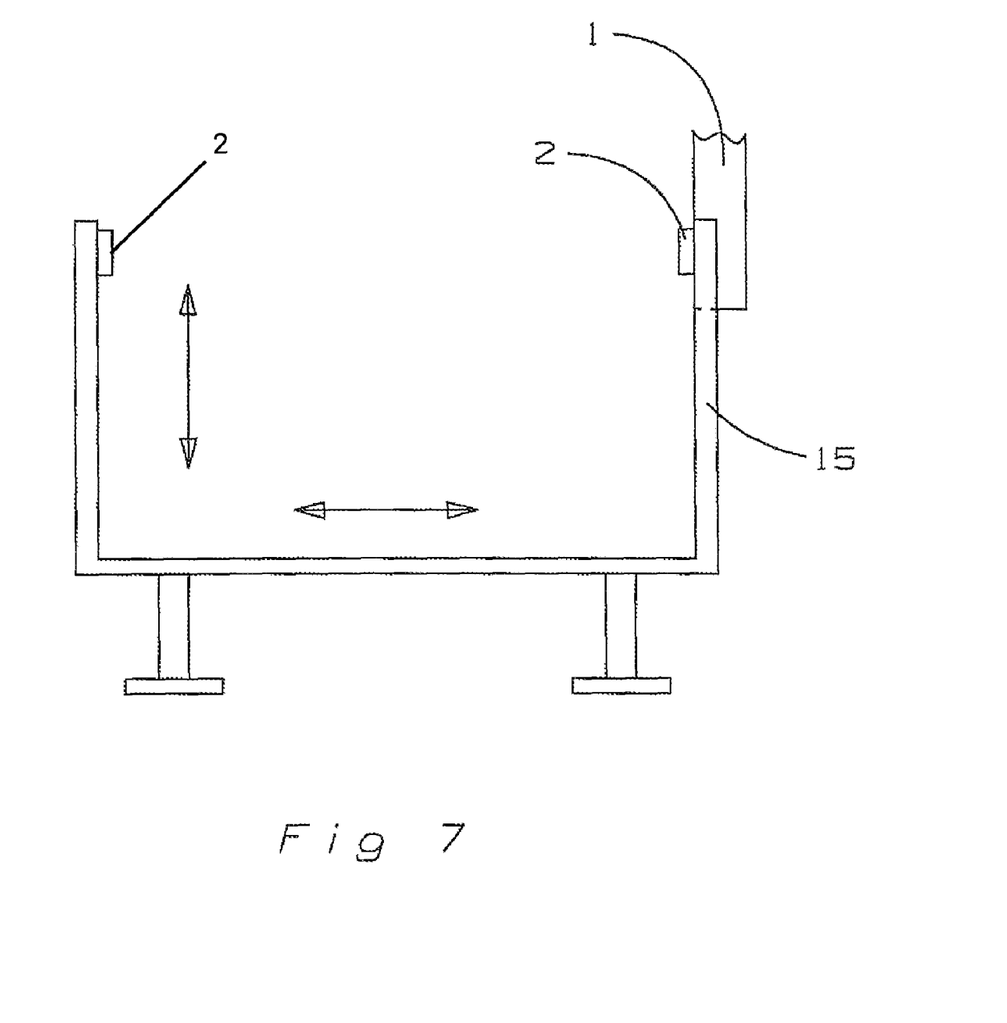
FIG. 7 shows a cross section view of the test stand used to hold the circular plates.

FIG. 7 shows the stand that holds the two circular plates in place at the proper height and width to test the vane. The stand places the circular plates are the required height so that the plates can easily be placed into position at the chamber openings so that the clamps can be moved into place to secure the circular plates to the chamber openings. The width of the stand ends are adjusted so that the two circular plates are spaced to fit the endwalls into the four-sided openings and hold the vane while the circular plate halves are bolted together to secure the vane endwalls to the circular plates. The side walls of the stand 15 include upper surfaces that have the same circumferential curvature as does the circular plates so that the plates can be supported on the side walls. FIG. 1 shows the side walls with the circular top surface. Two horizontal plates 2 extend across the side walls to aid in positioning and securing the circular plates to the stand 15 so that the circular plates will not fall off from the stand during bolting of the two halves together or movement into position on the chambers.

Once the vane to be tested has been secured to the two circular plates and held in the stand at the required height, the stand is placed into position so that the two circular plates can be clamped to the openings of the two chambers. The sealing tape can also be used to seal the interface between the circular plates and the edges of the opening in the chambers. With the circular plates secured to the chambers, the cross-over tube may be connected between the two chambers and the pressure source is opened to allow for the required volume of air to be applied to the two chambers. The air supplied to the two chambers will then flow into the vane internal cooling circuitry and then through the film cooling holes to allow for testing to determine if all of the film holes are producing the required air flow. With the apparatus of the present invention, the similar cooling flow characteristics can be provided to the vane in order to simulate the actual operating conditions of the engine as far as cooling air flow and pressure supply level are concerned. The vane during testing will not be exposed to the high temperature conditions found in the real engine. The large volume chambers are thick enough to allow for the high pressure to exist within the chamber to deliver the airflow through the vane. The chamber is large enough to allow for the air flow into the chamber to have the volume required for the testing and also to produce a static pressure inside simulating the engine airflow conditions.

The pressure chambers 10 and 11 used to supply the static air to the vane for testing is shown as being circular in shape. However, any shape can be used as long as the inside volume is large enough to convert the flow of pressurized air from the supply into the chamber so that the pressurized air is delivered to the vane as static air. The chamber walls must be thick enough to withstand the pressure of the air to prevent structural damage to the chamber wall.

The circular plates that secure the vane endwalls are shown as circular, but can be any shape as long as the plates can be clamped or secured to the chamber opening to close the chamber and to support the pressure loads when the static pressure is applied within the chamber. The plates can be rectangular or elliptical in shape, but must have an opening in which the vane endwalls can be secured for testing. In the present invention, the vane endwalls are secured to the circular plates by bolting the two plate halves together with the vane endwalls pinched between the four-sided openings formed within the two plate halves. Other forms of securing the vane endwall to the plate can be done without departing from the spirit and scope of the present invention.

We claim the following:

1. An apparatus for testing airflow through a turbine vane having first and second endwalls, the apparatus comprising:
    a first static pressure chamber having an open end and a volume of such size to produce a static pressure for supplying pressurized air flow to the vane to be tested;
    a pressurized air supply tube extending into the inside of the first pressure chamber to deliver pressurized air to the first pressure chamber; and,
    a first cover plate assembly having an opening to secure an endwall of the vane for testing, the cover plate also forming an enclosure for the first static pressure chamber; and,
    the pressurized air supply tube includes a row of holes to discharge the pressurized air supplied to the tube into the chamber to produce a static air for supply to the vane.

2. The apparatus for testing airflow through a turbine vane of claim 1, and further comprising:
    the opening of the static pressure chamber is round; and,
    the cover plate assembly is circular and of such size to fit onto the opening to produce a sealed interface between the static pressure chamber and the cover plate assembly.

3. An apparatus for testing airflow through a turbine vane having first and second endwalls, the apparatus comprising:
    a first static pressure chamber having an open end and a volume of such size to produce a static pressure for supplying pressurized air flow to the vane to be tested;
    a pressurized air supply tube extending into the inside of the first pressure chamber to deliver pressurized air to the first pressure chamber; and,
    a first cover plate assembly having an opening to secure an endwall of the vane for testing, the cover plate also forming an enclosure for the first static pressure chamber;

the cover plate assembly is formed of two half sections that form an opening, the opening being sized to secure an endwall of the vane for testing; and, means to secure the two cover plate halves together such that the vane is secured to the cover plate assembly.

4. The apparatus for testing airflow through a turbine vane of claim 3, and further comprising:

the opening in the cover plate halves forms a four-sided opening conforming the cross sectional shape of the endwall and with opposed corners that are aligned to the edges of the cover plate halves.

5. The apparatus for testing airflow through a turbine vane of claim 3, and further comprising:

the opening in the cover plate halves conforms to the shape of the vane endwall such that the vane endwall is secured between the cover plate halves for testing when the two cover plate halves are secured together.

6. The apparatus for testing airflow through a turbine vane of claim 3, and further comprising:

a sealing means held between the opening in the circular plate assembly and the endwall to limit leakage of air.

7. An apparatus for testing airflow through a turbine vane having first and second endwalls, the apparatus comprising:

a first static pressure chamber having an open end and a volume of such size to produce a static pressure for supplying pressurized air flow to the vane to be tested;

a pressurized air supply tube extending into the inside of the first pressure chamber to deliver pressurized air to the first pressure chamber; and, a first cover plate assembly having an opening to secure an endwall of the vane for testing, the cover plate also forming an enclosure for the first static pressure chamber; and, the static pressure chamber includes a plurality of quick release clamps to secure the cover plate assembly onto the opening of the static pressure chamber.

8. An apparatus for testing airflow through a turbine vane having first and second endwalls, the apparatus comprising:

a first static pressure chamber having an open end and a volume of such size to produce a static pressure for supplying pressurized air flow to the vane to be tested;

a pressurized air supply tube extending into the inside of the first pressure chamber to deliver pressurized air to the first pressure chamber; and, a first cover plate assembly having an opening to secure an endwall of the vane for testing, the cover plate also forming an enclosure for the first static pressure chamber; and, the static pressure chamber is supported by a plurality of legs such that the opening is located in a plane substantially perpendicular to a floor on which the testing occurs.

9. An apparatus for testing airflow through a turbine vane having first and second endwalls, the apparatus comprising:

a first static pressure chamber having an open end and a volume of such size to produce a static pressure for supplying pressurized air flow to the vane to be tested;

a pressurized air supply tube extending into the inside of the first pressure chamber to deliver pressurized air to the first pressure chamber; and, a first cover plate assembly having an opening to secure an endwall of the vane for testing, the cover plate also forming an enclosure for the first static pressure chamber;

a stand to support the cover plate assembly and the vane;

the stand including a side wall having a top surface sized and shaped to support the cover plate assembly and to position the cover plate assembly and the vane at a height so that the cover plate assembly can be secured to the opening of the pressure chamber; and, the stand includes means to adjust the width between the side walls to accommodate different sizes of vanes, and means to adjust the height for supporting the plate covers.

10. An apparatus for testing airflow through a turbine vane having first and second endwalls, the apparatus comprising:

a first static pressure chamber having an open end and a volume of such size to produce a static pressure for supplying pressurized air flow to the vane to be tested;

a pressurized air supply tube extending into the inside of the first pressure chamber to deliver pressurized air to the first pressure chamber; and, a first cover plate assembly having an opening to secure an endwall of the vane for testing, the cover plate also forming an enclosure for the first static pressure chamber;

a second static pressure chamber similar in size and shape to the first static pressure chamber;

a second cover plate assembly to secure the second endwall of the vane; and, a second pressurized air supply tube extending into the inside of the second pressure chamber to deliver pressurized air to the second pressure chamber.

11. The apparatus for testing airflow through a turbine vane of claim 10, and further comprising:

a stand to support the first and second cover plate assemblies with the vane secured between the two cover plate assemblies and ready for testing.

12. The apparatus for testing airflow through a turbine vane of claim 11, and further comprising:

the two cover plate assemblies are substantially parallel to each other when secured to the two static pressure chamber during the testing of the vane.

13. The apparatus for testing airflow through a turbine vane of claim 10, and further comprising:

the second static pressure chamber is the same size and shape as the first static pressure chamber.

14. The apparatus for testing airflow through a turbine vane of claim 10, and further comprising:

a cross-over tube connecting the first static pressure chamber to the second static pressure chamber to equalize the static pressure in both chambers.

15. The apparatus for testing airflow through a turbine vane of claim 14, and further comprising:

a pressure relief valve associated with the two pressure chambers to prevent excess pressure within each of the chambers.

16. The apparatus for testing airflow through a turbine vane of claim 10, and further comprising:

means to supply a different pressure to the first pressure chamber than to the second pressure chamber.

17. A process for testing airflow through a turbine vane having inner and outer endwalls comprising the steps of:

providing for two static pressure chamber each with an opening;

securing a vane to be tested onto a first cover plate and a second cover plate;

securing the first cover plate to the opening of the first static pressure chamber in a sealed state;

securing the second cover plate to the opening of the second static pressure chamber in a sealed state such that the vane is secured in place for testing;

supplying a volume of pressurized air to both static pressure chambers such that a static pressure is formed within the static pressure chambers; and, passing the static pressurized air from the chambers through the cooling circuit within the vane and out through the film holes such that the airflow through the vane can be tested.

18. The process for testing airflow through a turbine vane of claim 17, and further comprising the step of:

securing each vane endwall between two cover plate halves in a sealed manner.

19. The process for testing airflow through a turbine vane of claim 17, and further comprising the step of:

securing the vane endwall to the cover plate on a stand at a height in which the cover plate is at the same height as the opening in the static pressure chamber.

20. The process for testing airflow through a turbine vane of claim 17, and further comprising the step of:

securing the endwall of the vane between two cover plate halves by bolting the two cover plates halves together with the endwall positioned between the cover plate halves.

21. The process for testing airflow through a turbine vane of claim 17, and further comprising the steps of:

securing a vane to the pressure chambers in which the vane includes two different internal cooling air passages; and, supplying a different pressure to one of the pressure chambers that the other pressure chamber such that one of the internal cooling passages is supplied with higher pressure air than the other internal cooling passage.

22. The process for testing airflow through a turbine vane of claim 17, and further comprising the steps of:

connecting the first pressure chamber to the second pressure chamber with a cross-over tube such that the pressure in both chambers is equalized.

23. A process for testing airflow through a turbine vane having inner and outer endwalls comprising the steps of:

securing a turbine vane to a pressure chamber capable of producing a high static pressure within the pressure chamber;

supplying pressurized air to the pressure chamber so that a high static pressure is formed;

passing the static pressurized air from the pressure chamber through a cooling circuit within the turbine vane and out through the film holes such that the airflow through the turbine vane can be tested;

securing a first endwall of the turbine vane to a cover plate;

securing the cover plate over the pressure chamber to seal the pressure chamber;

securing a second endwall of the turbine vane to a second cover plate; and, securing the second cover plate over a second static high pressure chamber to seal the second static high pressure chamber.

24. The process for testing airflow through a turbine vane of claim 23, and further comprising the steps of:

connecting the first static high pressure chamber to the second static high pressure chamber so that the pressures are equalized.

\* \* \* \* \*